United States Patent
Nagasawa (10) Patent No.: US 7,872,632 B2
(45) Date of Patent: Jan. 18, 2011

(54) INFORMATION PROCESSING APPARATUS AND LUMINANCE CONTROL METHOD

(75) Inventor: Norikazu Nagasawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 875 days.

(21) Appl. No.: 11/656,917

(22) Filed: Jan. 23, 2007

(65) Prior Publication Data

US 2007/0176886 A1  Aug. 2, 2007

(30) Foreign Application Priority Data

Jan. 31, 2006 (JP) .............................. 2006-023916

(51) Int. Cl.
*G09G 3/36* (2006.01)

(52) U.S. Cl. ........................ 345/102; 345/87; 345/90

(58) Field of Classification Search .................. 345/36, 345/39, 42, 48, 51, 63, 84, 87, 90, 204, 205, 345/214, 690, 102; 313/504; 349/1, 61, 349/68; 359/9, 22; 348/800, 795, 40; 362/23, 362/27, 559; 315/291, 287
See application file for complete search history.

(56) References Cited

U.S. PATENT DOCUMENTS

| | | | | |
|---|---|---|---|---|
| 4,929,936 | A * | 5/1990 | Friedman et al. ............ | 345/618 |
| 7,358,685 | B2 * | 4/2008 | Lee .............................. | 315/287 |
| 7,658,529 | B2 * | 2/2010 | Aoki et al. ................... | 362/559 |
| 2002/0012076 | A1 * | 1/2002 | Vos et al. ..................... | 348/800 |
| 2004/0004591 | A1 * | 1/2004 | Akimoto et al. ............... | 345/84 |
| 2004/0032958 | A1 * | 2/2004 | Park ............................. | 381/77 |
| 2004/0233348 | A1 * | 11/2004 | Mai .............................. | 349/69 |
| 2005/0068503 | A1 * | 3/2005 | Imade .......................... | 353/31 |
| 2005/0093792 | A1 * | 5/2005 | Yamamoto et al. ............ | 345/83 |
| 2005/0218418 | A1 * | 10/2005 | Cok ............................. | 257/98 |
| 2006/0043527 | A1 * | 3/2006 | Kwak .......................... | 257/532 |
| 2006/0055319 | A1 * | 3/2006 | Uemura et al. .............. | 313/504 |
| 2006/0092634 | A1 * | 5/2006 | Hiyama et al. .............. | 362/231 |
| 2006/0109389 | A1 * | 5/2006 | Ichikawa et al. ............... | 349/1 |
| 2006/0238464 | A1 * | 10/2006 | Hillis et al. ................... | 345/82 |
| 2006/0261752 | A1 * | 11/2006 | Lee .............................. | 315/291 |
| 2007/0103908 | A1 * | 5/2007 | Tabito et al. ................. | 362/294 |

FOREIGN PATENT DOCUMENTS

| | | |
|---|---|---|
| JP | 9-258693 | 10/1997 |
| JP | 2001-76525 | 3/2001 |
| JP | 2002-100485 | 4/2002 |

* cited by examiner

*Primary Examiner*—Prabodh Dharia
(74) *Attorney, Agent, or Firm*—Knobbe, Martens, Olson & Bear, LLP (57) ABSTRACT

An information processing apparatus may include a light source which illuminates a display panel and a first area in which a first red element, first green element and first blue element and a second area which is arranged in one direction with respect to the first area and in which a second red element, a second green element connected in series to the first green element and a second blue element, a first control circuit which is connected to an anode of the first red element and a cathode of the second red element, a second control circuit which is connected to an anode of the first green element and a cathode of the second green element, and a third control circuit which is connected to an anode of the first blue element and a cathode of the second blue element.

12 Claims, 5 Drawing Sheets

INFORMATION PROCESSING APPARATUS AND LUMINANCE CONTROL METHOD

CROSS-REFERENCE TO RELATED APPLICATIONS

This application is based upon and claims the benefit of priority from Japanese Patent Application No. 2006-023916, filed Jan. 31, 2006, the entire contents of which are incorporated herein by reference.

BACKGROUND

1. Field

One embodiment of the invention relates to an information processing apparatus including a display unit which has light emitting elements as a light source and a luminance control method applied to the information processing apparatus.

2. Description of the Related Art

Recently, portable terminal devices each including a display unit such as a liquid crystal display (LCD) which has light emitting elements such as light emitting diodes (LEDs) as a light source are developed. The light emitting efficiency of the LED was low in the past, but now the light emitting efficiency thereof is sufficiently corrected.

In Jpn. Pat. Appln. KOKAI Publication No. 2001-76525, an illumination equipment in which luminance irregularity is corrected by alternately arranging LEDs connected to a first power supply control circuit and LEDs connected to a second power supply control circuit is disclosed.

Further, in Jpn. Pat. Appln. KOKAI Publication No. 2002-100485, the technique for attaining a white-light emitting source by use of a red LED, green LED and blue LED is described.

Luminance irregularity occurs since the characteristics of LEDs are variously changed, and therefore, it is considered to adjust the luminance by feeding back a current in order to correct the luminance irregularity. According to the above document, the cathodes of the LEDs connected to the first power supply control circuit and the cathodes of the LEDs connected to the second power supply control circuit are grounded. If the magnitude of the current is measured, the current will be set equal to an average magnitude of a current flowing through a circuit which includes the LEDs connected to the first power supply control circuit and a current flowing through a circuit which includes the LEDs connected to the second power supply control circuit. As a result, it is difficult to perform the precise feedback operation. Therefore, it is difficult to correct the luminance irregularity of the display unit.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus comprises a display panel which displays an image, a light source which illuminates the display panel and includes a first area in which a first red light emitting element, first green light emitting element and first blue light emitting element are arranged and a second area which is arranged in one direction with respect to the first area and in which a second red light emitting element connected in series to the first red light emitting element, a second green light emitting element connected in series to the first green light emitting element and a second blue light emitting element connected to the first blue light emitting element are arranged, a first control circuit which is connected to an anode of the first red light emitting element and a cathode of the second red light emitting element to adjust a magnitude of a current flowing through the first and second red light emitting elements, a second control circuit which is connected to an anode of the first green light emitting element and a cathode of the second green light emitting element to adjust a magnitude of a current flowing through the first and second green light emitting elements, and a third control circuit which is connected to an anode of the first blue light emitting element and a cathode of the second blue light emitting element to adjust a magnitude of a current flowing through the first and second blue light emitting elements.

First, the configuration of an information processing apparatus according to one embodiment of this invention is explained with reference to FIGS. 1 and 2. The information processing apparatus is realized as a portable notebook size personal computer 10 which can be driven by use of a battery.

Figure 1:
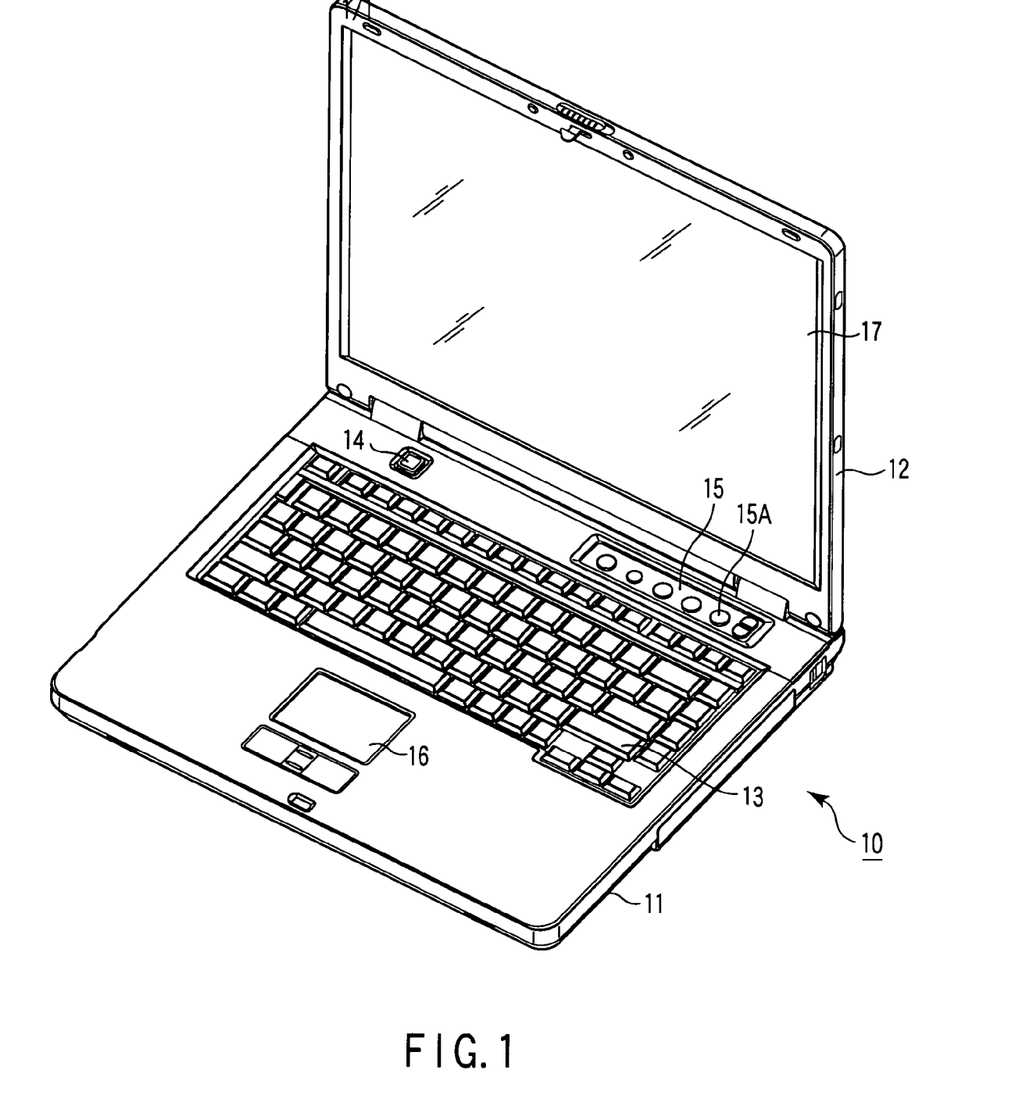
FIG. 1 is an exemplary perspective view showing the appearance of an information processing apparatus according to one embodiment of this invention.

FIG. 1 is perspective view showing the portable notebook size personal computer 10 with the display unit set in an open state. The computer 10 includes a computer main body 11 and display unit 12. A display panel configured by a liquid crystal display (LCD) 17 and backlight is incorporated in the display unit 12 and the display screen of the LCD 17 is set in substantially the central portion of the display unit 12. The LCD 17 is configured by a transparent type liquid crystal display panel. In the display unit 12, a backlight is arranged on the rear surface of the LCD 17. The backlight functions as an illumination device of the display unit 12. The backlight includes light emitting elements such as light emitting diodes (LEDs) as a light source. By using an LED group as the light source of the backlight, the service life of the backlight can be made longer and the power consumption can be lowered. In the present embodiment, light of a desired color, for example, white-color light is emitted by using three types of LEDs including red, green and blue LEDs.

The display unit 12 is supported on the computer main body 11 and mounted to be freely rotated with respect to the computer main body 11 between an open position in which the upper surface of the computer main body 11 is exposed and a closed position in which it covers the upper surface of the computer main body 11. The computer main body 11 has a thin box-type casing and a keyboard 13, a power button which turns ON/OFF the power supply of the computer 10, an input operation panel 15, a touch pad 16 and the like are arranged on the upper surface of the computer main body.

The input operation panel 15 is an input device which inputs an event corresponding to a depressed button and has a plurality of buttons to respectively start a plurality of functions. The button group includes a luminance control button 15A.

The luminance control button 15A is a button switch to adjust the display luminance of the LCD 17, that is, the luminance of the LED. When the luminance control button 15A is depressed by the user, an event indicating one of an increase (high luminance) and decrease (low luminance) of the luminance of a white LED is issued. The computer 10 has a luminance control function of switching the luminance of the LED at eight stages of display luminance levels "8" to "1". In the present embodiment, each time the luminance control button 15A is depressed by the user, the luminance of the LED is toggled in the order of the display luminance level "8", →"7", →"6", . . . , →"1", →"8".

Next, the system configuration of the computer 10 is explained with reference to FIG. 2.

Figure 2:
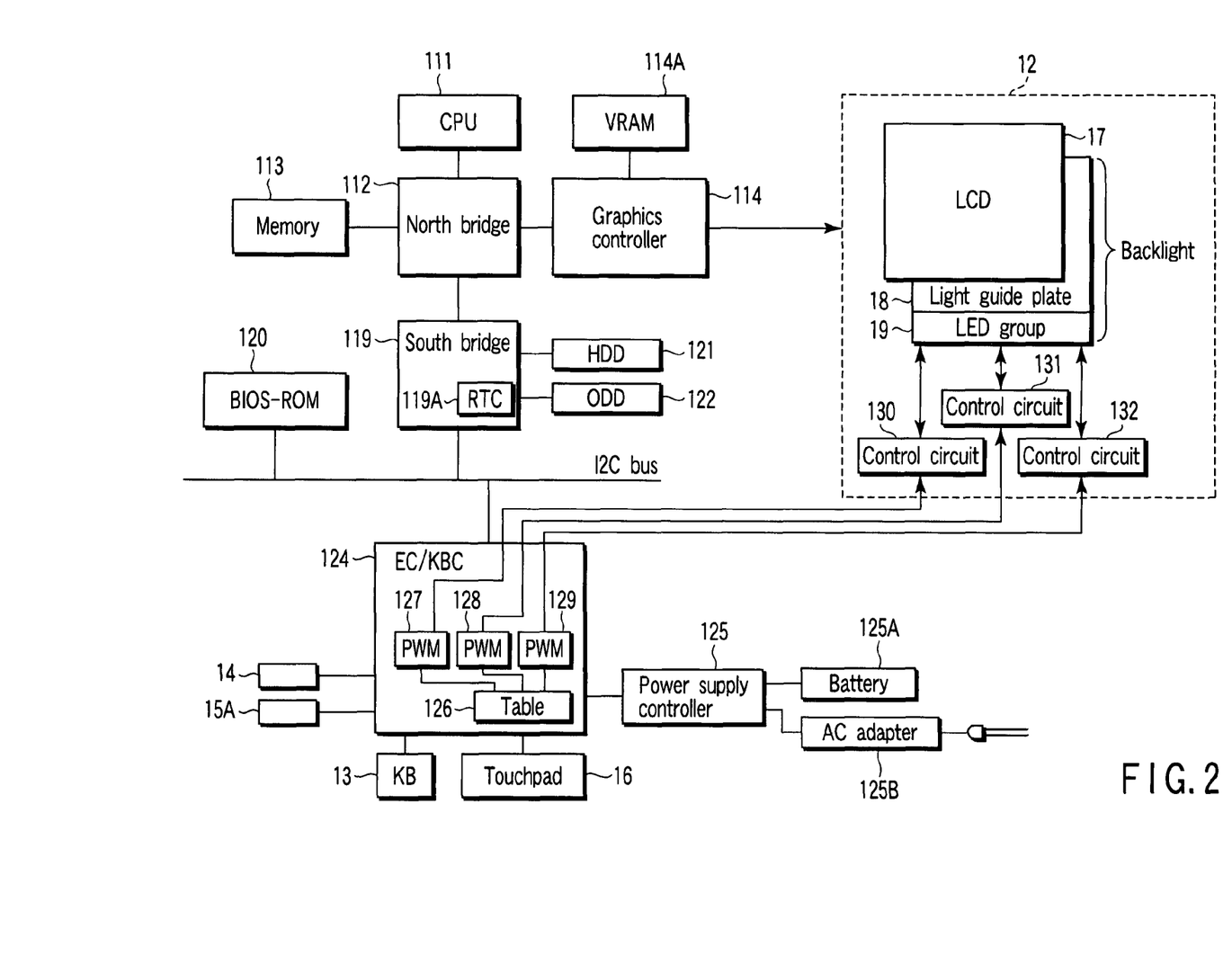
FIG. 2 is an exemplary block diagram showing an example of the system configuration of the information processing apparatus of FIG. 1.

As shown in FIG. 2, the computer 10 includes a CPU 111, north bridge 112, main memory 113, graphics controller 114, south bridge 119, BIOS-ROM 120, hard disk drive (HDD) 121, optical disk drive (ODD) 122, embedded controller/keyboard controller IC (EC/KBC) 124, power supply controller 125 and the like.

The CPU 111 is a processor provided to control the operation of the computer 10 and executes an operating system (OS) and various application programs which are loaded from the hard disk (HDD) 121 into the main memory 113.

Further, the CPU 111 executes a system Basic Input-Output System (BIOS) stored in the BIOS-ROM 120. The system BIOS is a program for hardware control.

The north bridge 112 is a bridge device which connects the local bus of the CPU 111 with the south bridge 119.

A memory controller which controls access to the main memory 113 is contained in the north bridge 112. Further, the north bridge 112 has a function of making communication with the graphics controller 114 via an Accelerated Graphics Port (AGP) bus or the like.

The graphics controller 114 is a display controller which controls the LCD 17 used as a display monitor of the computer 10. The graphics controller 114 has a video memory (VRAM) 114A and generates a video signal used to create a display image to be displayed on the LCD 17 of the display unit 12 based on display data written into the video memory 114A according to an OS/application program.

The south bridge 119 controls various devices connected to a 12C bus. The south bridge 119 contains an Integrated Drive Electronics (IDE) controller to control the HDD 121 and ODD 122. Further, the south bridge 119 has a function of controlling access to the BIOS-ROM 120.

A real-time clock (RTC) 119A is contained in the south bridge 119. The real-time clock 119A is a timepiece module which counts the date and time and is operated by a battery exclusively used for the real-time clock (RTC) 119A during a period in which the computer 10 is set in the power-off state.

In addition, the real-time clock 119A has a function of measuring and storing the turn-on period of the LED group 19.

The HDD 121 is a storage device which stores various software and data items. In the HDD 121, the above-described operating system and various application systems are stored.

The optical disk drive (ODD) 122 is a drive unit which drives a storage medium such as a DVD and CD in which video contents are stored.

The embedded controller/keyboard controller IC (EC/KBC) 124 is a one-chip microcomputer in which an embedded controller for power management and a keyboard controller to control the keyboard (KB) 13 and touch pad 16 are integrated. Further, the embedded controller/keyboard controller IC (EC/KBC) 124 has a function of setting the computer 10 into a power-on/power-off state according to the operation of the power button 14 by the user in cooperation with the power supply controller 125.

The power supply controller 125 generates system power supply voltages to be supplied to various components of the computer 10 by use of external power supply voltage supplied from an AC adapter 125B when the external power supply voltage is supplied via the AC adapter 125B. When external power supply voltage is not supplied from the AC adapter 125B, the power supply controller 125 generates system power supply voltages to be supplied to various components (computer main body 12 and display unit (display portion) 14) of the computer 10 by use of a battery 125A.

The embedded controller/keyboard controller IC 124 has a function of controlling the display luminance of the LED group 19. The embedded controller/keyboard controller IC 124 uses a luminance control table 126 to control the luminance of the LED. In the luminance control table, luminance control data (first luminance control data, second luminance control data, third luminance control data) corresponding to the display luminance levels "8" to "1" are set according to the color types of lights generated from the LEDs and the turn-on period of the LED group 19. Since luminance control data items corresponding to the display luminance levels "8" to "1" are set for the respective types of LEDs according to the application times of the LEDs, color drifting can be suppressed by using luminance control data corresponding to the application times even if the LEDs are deteriorated with time and the luminance levels of the LEDs vary. Further, luminance control data (first luminance control data, second luminance control data, third luminance control data) corresponding to the display luminance levels "8" to "1" may be set according to the color types of lights generated from the LEDs and the turn-on period of the LED group for respective color temperatures.

A PWM circuit 127 used as a first generation circuit acquires luminance control data corresponding to a red LED from the luminance control table 126 according to the turn-on period and display luminance level measured by the RTC 119A and generates a PWM signal (first luminance control signal) corresponding to the luminance control data (first luminance control data). The duty ratio of the PWM signal varies depending on the value of the luminance control data. The PWM signal generated from the PWM circuit 127 is supplied as a luminance control signal to a first control circuit 130 provided in the display unit 12. The first control circuit 130 is a circuit which drives the red LEDs in the LED group 19. The first control circuit 130 functions as a boost DC-DC converter. The first control circuit 130 adjusts the magnitude of a current corresponding to drive voltage supplied to the red LEDs in the LED group 19 according to the PWM signal supplied from the PWM circuit 127 in order to adjust the magnitude of the current flowing through the red LEDs in the LED group 19.

A PWM circuit 128 used as a second generation circuit acquires luminance control data corresponding to a green LED from the luminance control table 126 according to the turn-on period and display luminance level measured by the RTC 119A and generates a PWM signal (second luminance control signal) corresponding to the luminance control data (second luminance control data). The duty ratio of the PWM signal varies depending on the value of the luminance control data. The PWM signal generated from the PWM circuit 128 is supplied as a luminance control signal to a second control circuit 131 provided in the display unit 12. The second control circuit 131 is a circuit which drives the green LEDs in the LED group 19. The second control circuit 131 functions as a boost DC-DC converter. The second control circuit 131 adjusts the magnitude of a current corresponding to drive voltage supplied to the green LEDs in the LED group 19 according to the PWM signal supplied from the PWM circuit 128 in order to adjust the magnitude of the current flowing through the green LEDs in the LED group 19.

A PWM circuit 129 used as a third generation circuit acquires luminance control data corresponding to a blue LED from the luminance control table 126 according to the turn-on period and display luminance level measured by the RTC 119A and generates a PWM signal (third luminance control signal) corresponding to the luminance control data (third luminance control data). The duty ratio of the PWM signal varies depending on the value of the luminance control data. The PWM signal generated from the PWM circuit 129 is supplied as a luminance control signal to a third control circuit 132 provided in the display unit 12. The third control circuit 132 is a circuit which drives the blue LEDs in the LED group 19. The third control circuit 132 functions as a boost DC-DC converter. The third control circuit 132 adjusts the magnitude of a current corresponding to drive voltage supplied to the blue LEDs in the LED group 19 according to the PWM signal supplied from the PWM circuit 129 in order to adjust the magnitude of the current flowing through the blue LEDs in the LED group 19.

The LED group 19 is attached to one end portion of the light guide plate 18 provided on the rear surface of the LCD 17. Light from the LED group 19 is illuminated in a plane form by the light guide plate 18. A backlight is configured by the light guide plate 18 and LED group 19.

Figure 3:
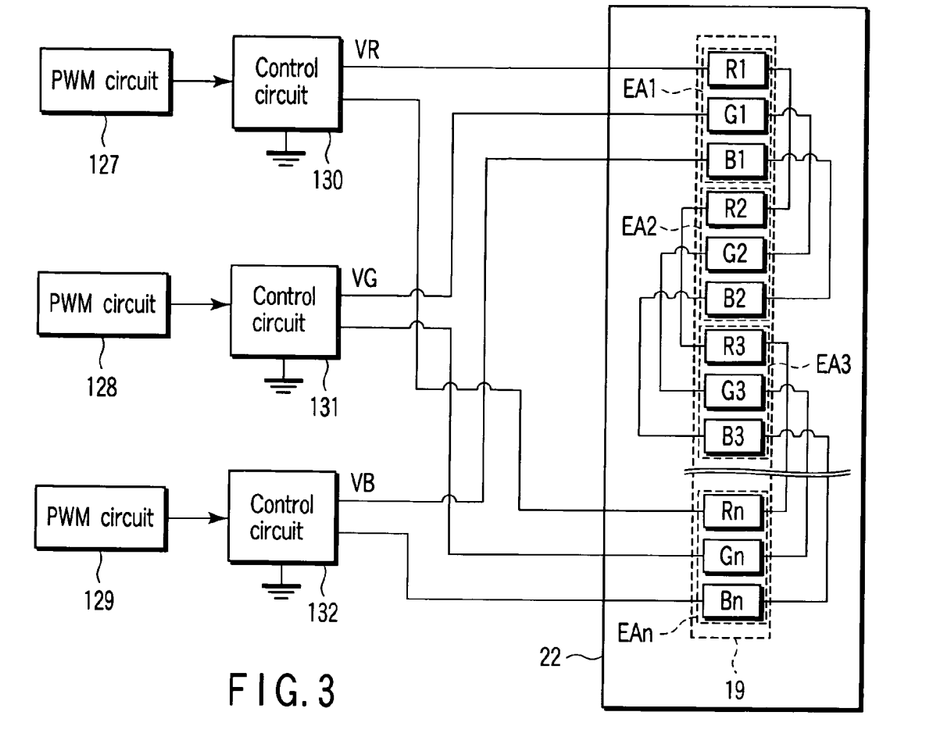
FIG. 3 is an exemplary block diagram showing an example of the configuration of an LED drive circuit and LED group provided on the information processing apparatus of FIG. 1.
Figure 4:
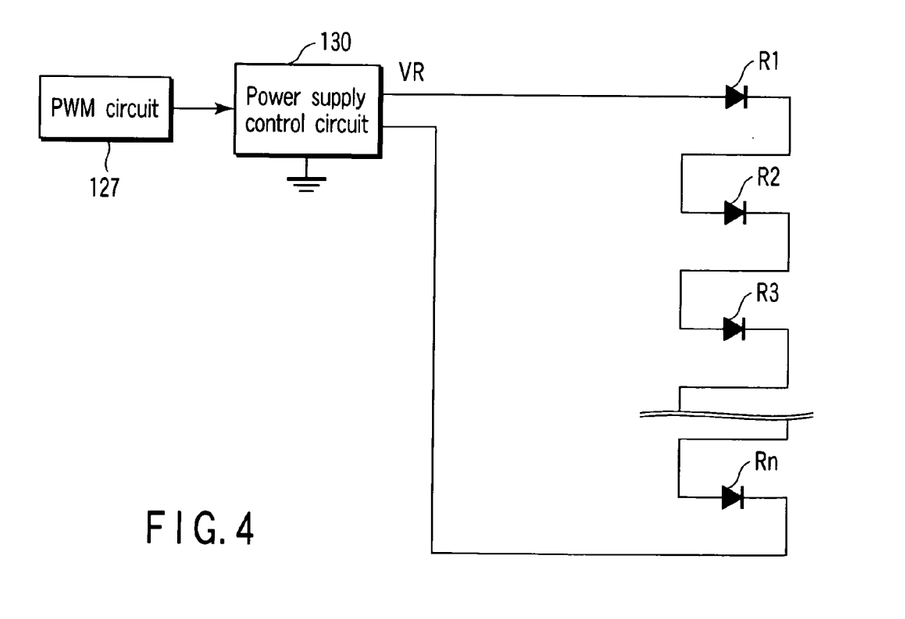
FIG. 4 is an exemplary diagram showing the configuration of a power supply control circuit and LEDs of FIG. 3.

Next, the configurations of the LED group 19 and control circuits 130, 131, 132 are explained with reference to FIGS. 3 and 4. The LED group 19 is configured by mounting a plurality of LEDs in one direction on the printed board 22 having a plurality of wiring layers. A plurality of light emitting areas EA1, EA2, EA3, ..., EAn arranged in one direction are set in an area of the printed board 22 on which the LEDs are mounted. It is possible to use a flexible printed board instead of the printed board 22.

In the first light emitting area EA1, a red LED R1 (first red light emitting element), green LED G1 (first green light emitting element) and blue LED B1 (first blue light emitting element) are arranged in one direction in this order. In the second light emitting area EA2, a red LED R2 (second red light emitting element), green LED G2 (second green light emitting element) and blue LED B2 (second blue light emitting element) are arranged in one direction in this order. Further, in the third light emitting area EA3, a red LED R3 (third red light emitting element), green LED G3 (third green light emitting element) and blue LED B3 (third blue light emitting element) are arranged in one direction in this order.

In the light emitting area EAn, a red LED Rn (n-th red light emitting element), green LED Gn (n-th green light emitting element) and blue LED Bn (n-th blue light emitting element) are arranged in one direction in this order.

The red LEDs R1, R2, ..., Rn are connected in series. The green LEDs G1, G2, ..., Gn are connected in series. The blue LEDs B1, B2, ..., Bn are connected in series.

One end of the series-connected red LEDs R1, R2, ..., Rn, that is, the anode of the red LED R1 and the other end thereof, that is, the cathode of the red LED Rn are connected to the first control circuit 130.

One end of the series-connected green LEDs G1, G2, ..., Gn, that is, the anode of the green LED G1 and the other end thereof, that is, the cathode of the green LED Gn are connected to the second control circuit 131.

One end of the series-connected blue LEDs B1, B2, ..., Bn, that is, the anode of the blue LED B1 and the other end thereof, that is, the cathode of the blue LED Bn are connected to the third control circuit 132.

The LEDs in each of the light emitting areas EAi (i=1, 2, 3, ..., n) are arranged in positions corresponding to the control circuits 130, 131, 132 which supply drive voltages.

The first control circuit 130 has a function of detecting the magnitude of a current flowing through the series-connected red LEDs R1, R2, R3, ..., Rn. Since the cathodes of the red LEDs R1, R2, R3, ..., Rn are not grounded, the first control circuit 130 is not influenced by currents flowing through the LEDs connected to the other control circuits 131, 132 and can precisely detect a current flowing through the red LEDs R1, R2, R3, ..., Rn. The first control circuit 130 adjusts the magnitude of drive voltage VR based on the duty ratio of a PWM signal input as a luminance control signal from the PWM control circuit 127 and the magnitude of the detected current.

The second control circuit 131 has a function of detecting the magnitude of a current flowing through the series-connected green LEDs G1, G2, G3, ..., Gn. Since the cathodes of the green LEDs G1, G2, G3, ..., Gn are not grounded, the second control circuit 131 is not influenced by currents flowing through the LEDs connected to the other control circuits 130, 132 and can precisely detect a current flowing through the green LEDs G1, G2, G3, ..., Gn. The second control circuit 131 adjusts the magnitude of drive voltage VG based on the duty ratio of a PWM signal input as a luminance control signal from the PWM control circuit 128 and the magnitude of the detected current.

The third control circuit 132 has a function of detecting the magnitude of a current flowing through the series-connected blue LEDs B1, B2, B3, ..., Bn. Since the cathodes of the blue LEDs B1, B2, B3, ..., Bn are not grounded, the third control circuit 132 is not influenced by currents flowing through the LEDs connected to the other control circuits 130, 131 and can precisely detect a current flowing through the blue LEDs B1, B2, B3, ..., Bn. The third control circuit 132 adjusts the magnitude of drive voltage VB based on the duty ratio of a PWM signal input as a luminance control signal from the PWM control circuit 129 and the magnitude of the detected current.

Since the control circuits 130, 131, 132 can precisely detect the magnitudes of currents flowing through the LEDs, the precision of feedback based on the detected currents becomes high and luminance irregularity can be corrected.

When the conventional LEDs are used as a light source, the LEDs which lie in the same light emitting area are driven by use of the same power supply drive circuit. Further, terminals used to supply drive voltages to the LEDs are often arranged on the end portions of the printed board. Therefore, the lengths of wiring patterns which connect the terminals to the series-connected LEDs are different depending on the light emitting areas. However, drive voltages greatly vary according to the light emitting areas (power supply control circuits) due to a difference in the resistances of the wiring patterns if the lengths of the wiring patterns are different. As a result, the luminance levels of the light emitting areas tend to vary.

In the case of the present embodiment, the LEDs in the light emitting areas are respectively driven by the different power supply control circuits. Therefore, the lengths of the wiring pattern which serially connects the red LEDs R1, R2, R3, . . . , Rn, the wiring pattern which serially connects the green LEDs G1, G2, G3, . . . , Gn and the wiring pattern which serially connects the blue LEDs B1, B2, B3, . . . , Bn are set equal to one another. As a result, drive voltages will not greatly vary according to the power supply control circuits and the luminance of the screen of the LCD 17 can be made uniform.

When the screen size becomes larger, the number of LEDs to be driven in parallel becomes larger and it becomes necessary to increase the drive voltage and widen the wiring pattern connected to the LEDs. Since the wiring pattern is widened, the outer size of the printed board becomes larger. The configuration in which a large image screen can be attained without widening the wiring pattern is shown in FIG. 5.

Figure 5:
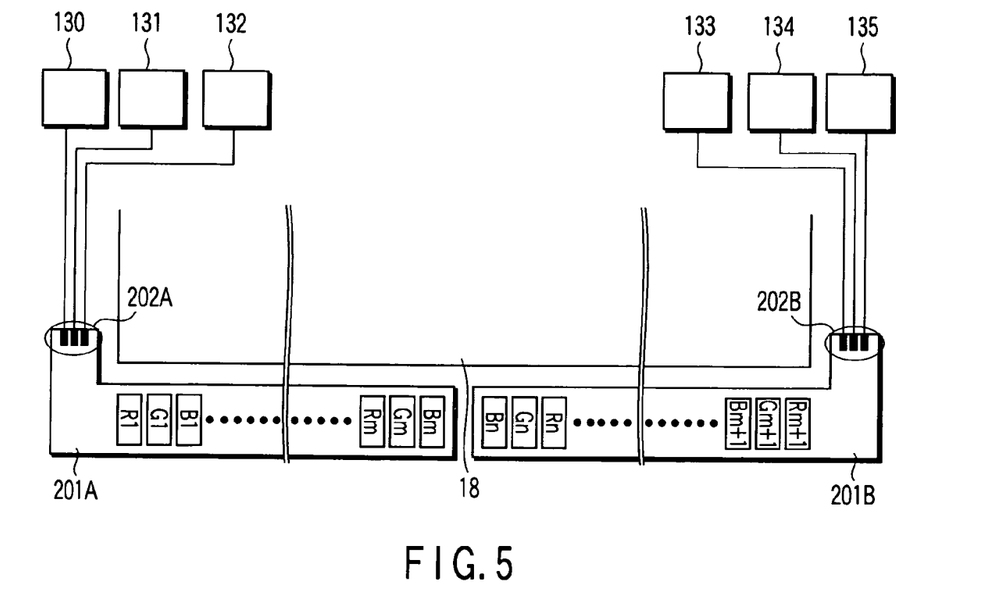
FIG. 5 is an exemplary diagram showing a printed board having LEDs mounted thereon and a light guide plate.

As shown in FIG. 5, a first printed board 201A on which red LEDs R1, . . . , Rm, green LEDs G1, . . . , Gm and blue LEDs B1, . . . , Bm are mounted and a second printed board 201B on which red LEDs Rm+1, . . . , Rn, green LEDs Gm+1, . . . , Gn and blue LEDs Bm+1, . . . , Bn are mounted are provided on one end portion of the light guide plate 18.

A first terminal group 202A to respectively supply drive voltages output from the first control circuit 130, second control circuit 131 and third control circuit 132 to the red LEDs R1, . . . , Rm, green LEDs G1, . . . , Gm and blue LEDs B1, . . . , Bm is provided on the first printed board 201A.

A second terminal group 202B to respectively supply drive voltages output from a fourth control circuit 133 which drives red LEDs and is different from the first control circuit 130, a fifth control circuit 134 which drives green LEDs and is different from the second control circuit 131 and a sixth control circuit 135 which drives blue LEDs and is different from the third control circuit 132 to the red LEDs Rm+1, . . . , Rn, green LEDs Gm+1, . . . , Gn and blue LEDs Bm+1, . . . , Bn is provided on the second printed board 201B. The first and second printed boards 201A and 201B are arranged to sandwich the light guide plate 18. It becomes possible to suppress the outer size from becoming larger without widening the wiring pattern by providing the terminal groups 202A, 202B which supply the drive voltages on the right and left sides of the light guide plate 18.

The PWM circuits 127, 128, 129 and graphics controller 114 are provided in the computer main body 11. In order to display an image on the LCD 17, it is necessary to supply signals of plural channels including a video signal from the graphics controller 114 and PWM signals from the PWM circuits 127, 128, 129 to the display unit 12. In order to supply the signals of plural channels, a plurality of cables are required to supply a plurality of signals to the display unit 12 and an arrangement area for arrangement of the cables is required. The configuration in which the arrangement area for the cables can be suppressed is shown in FIG. 6.

Figure 6:
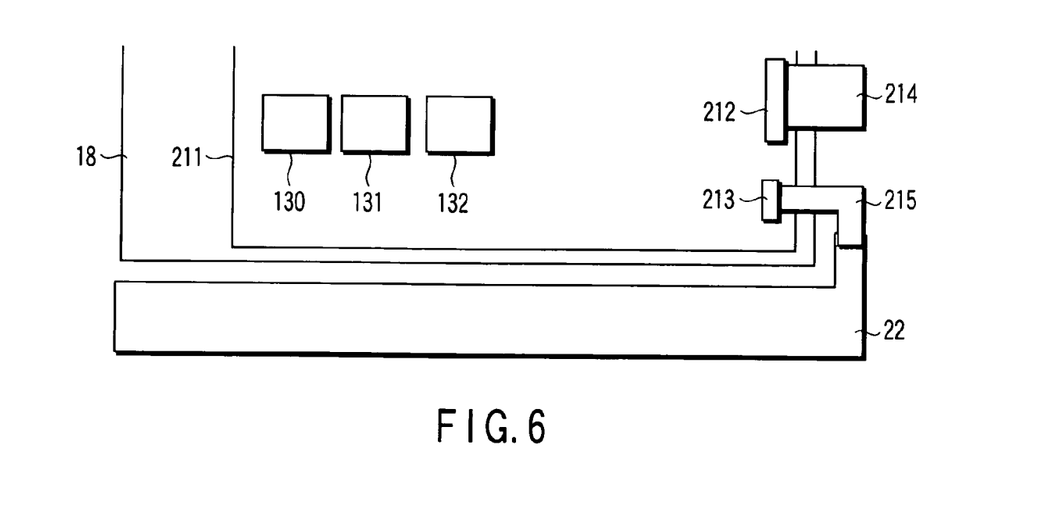
FIG. 6 is an exemplary diagram showing a printed board having LEDs mounted thereon and an interface substrate connected to the printed board.

As shown in FIG. 6, an interface substrate 211 is arranged on the rear surface of the light guide plate 18. On the interface substrate 211, the control circuits 130, 131, 132, first terminal 212 and second terminal 213 are provided. A first flexible printed board 214 is connected to the first terminal 212. A video signal and PWM signals supplied from the computer main body 11 are supplied to the first flexible printed board 214.

A second flexible printed board 215 connected to the printed board 22 is connected to the second terminal 213. The control circuits 130, 131, 132 respectively adjust the drive voltages VR, VG, VB according to the three types of PWM signals supplied to the interface substrate 211. Then, the drive voltages VR, VG, VB are supplied to the printed board 22 by use of the second flexible printed board 215 which connects the interface substrate 211 to the printed board 22.

With the above configuration, the three types of PWM signals and video signal can be supplied by use of the single first terminal 212 by connecting the printed board 22 to the interface substrate 211. As a result, the cables used to supply the drive voltages VR, VG, VB and video signal can be arranged only by use of the single first flexible printed board 214 and thus an increase in the arrangement area can be suppressed.

In the notebook size personal computer 10 described above, the control circuits 130, 131, 132 are arranged in the display unit 12. However, it is also possible to arrange the control circuits 130, 131, 132 in the computer main body 11.

Figure 7:
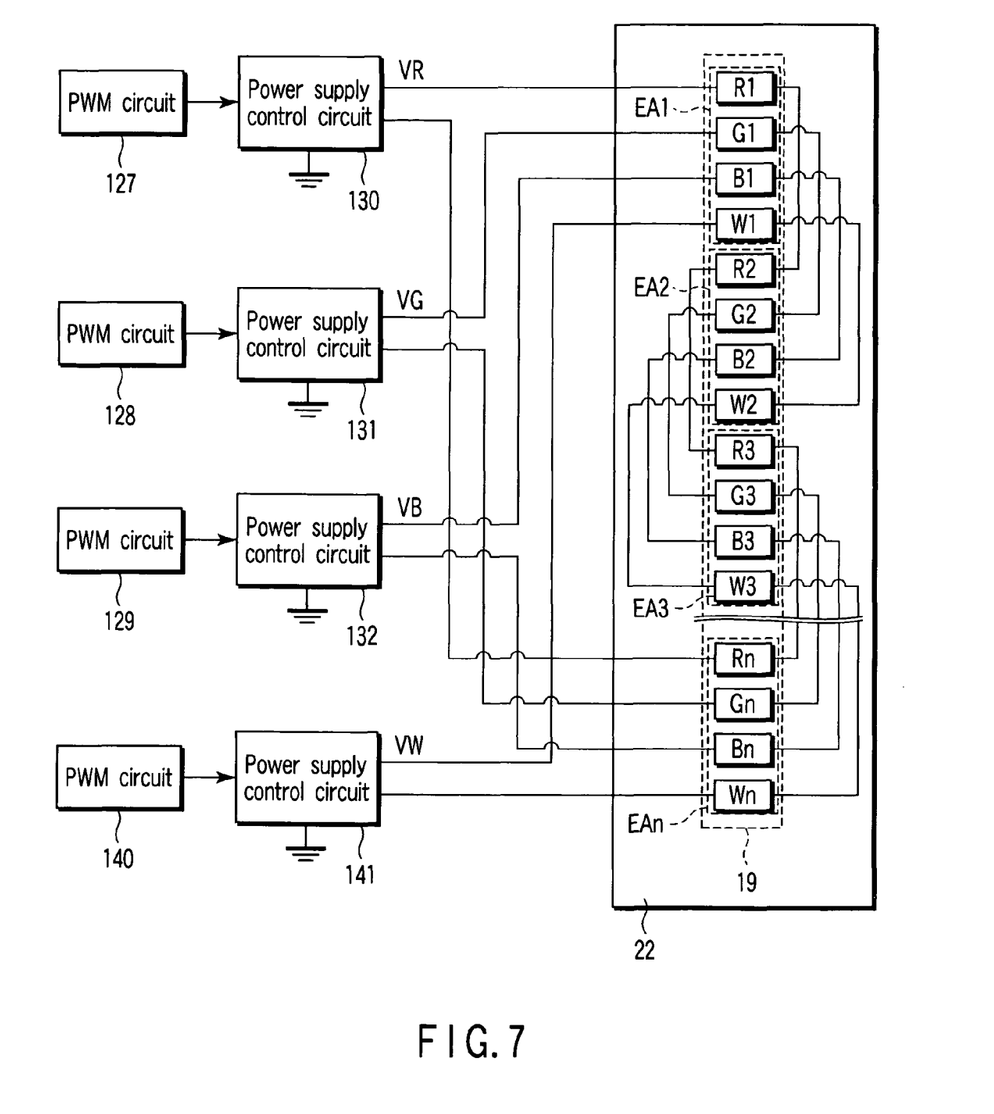
FIG. 7 is an exemplary block diagram showing a modification of the configuration of the LED drive circuit and LED group provided on the information processing apparatus of FIG. 1.

Further, as shown in FIG. 7, white LEDs W1, W2, W3, . . . , Wn may be arranged in the LED group 19. In the first light emitting area EA1, a red LED R1, green LED G1, blue LED B1 and white LED W1 are arranged in one direction in this order. In the second light emitting area EA2, a red LED R2, green LED G2, blue LED B2 and white LED W2 are arranged in one direction in this order. Further, in the third light emitting area EA3, a red LED R3, green LED G3, blue LED B3 and white LED W3 are arranged in one direction in this order. In the light emitting area EAn, a red LED Rn, green LED Gn, blue LED Bn and white LED Wn are arranged in one direction in this order.

The white LEDs W1, W2, W3, . . . , Wn are connected in series. The green LEDs G1, G2, . . . , Gn are connected in series. The blue LEDs B1, B2, . . . , Bn are connected in series.

One end of the series-connected white LEDs W1, RW, . . . , Wn, that is, the anode of the white LED W1 and the other end thereof, that is, the cathode of the white LED Rn are connected to a fourth control circuit 141.

A PWM circuit 140 acquires luminance control data corresponding to the white LEDs from the luminance control table 126 according to the turn-on period and display luminance level measured by the RTC 119A and generates a PWM signal (fourth luminance control signal) corresponding to the luminance control data (fourth luminance control data). The duty ratio of the PWM signal varies depending on the value of the luminance control data. The PWM signal generated from the PWM circuit 140 is supplied as a luminance control signal to the fourth control circuit 141 provided in the display unit 12. The fourth control circuit 141 is a circuit which drives the white LEDs in the LED group 19. The fourth control circuit 141 functions as a boost DC-DC converter. The fourth control circuit 141 adjusts the magnitude of a current corresponding to drive voltage supplied to the white LEDs in the LED group 19 according to the PWM signal supplied from the PWM circuit 140 in order to adjust the magnitude of the current flowing through the white LEDs in the LED group 19.

In the configuration of the printed board on which the LEDs shown in FIG. 5 are mounted, the white LEDs can be mounted on the first printed board 201A and second printed board 201B. In this case, terminals connected to the fourth control circuit to adjust the magnitude of a current corresponding to drive voltage supplied to the white LEDs in the LED group 19 according to the PWM signal supplied from the PWM circuit in order to adjust the magnitude of the current flowing through the white LEDs in the LED group 19 are provided on the first terminal group 202A and terminals connected to a fifth control circuit to adjust the magnitude of current corresponding to drive voltage supplied to the white LEDs in the LED group 19 according to the PWM signal supplied from the PWM circuit in order to adjust the magnitude of the current flowing through the white LEDs in the LED group 19 are provided on the second terminal group 202B.

Further, in the configuration shown in FIG. 6, the white LEDs may be mounted on the printed board 22 and the fourth control circuit which adjusts the magnitude of a current corresponding to drive voltage supplied to the white LEDs in the LED group 19 according to the PWM signal supplied from the PWM circuit may be mounted on the interface substrate 211 in order to adjust the magnitude of the current flowing through the white LEDs. Likewise, in this case, drive voltage VW is supplied to the white LEDs from the fourth control circuit via the second flexible printed board 215.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a display panel which displays an image;
a light source configured to emit light and comprising a first area and a second area which are arranged in one direction, the first area comprising a first red light emitting element, first green light emitting element, and a first blue light emitting element which are arranged in the one direction, and the second area comprising a second red light emitting element connected in series to the first red light emitting element, a second green light emitting element connected in series to the first green light emitting element and a second blue light emitting element connected to the first blue light emitting element, the second red light emitting element, the second green light emitting element, and the second blue light emitting element being arranged in the one direction;
a light guide plate provided on the rear surface of the display panel, and including an end portion to which the light source is attached, wherein the light emitted from the light source is guided to illuminate the display panel;
a first control circuit which is connected to an anode of the first red light emitting element and a cathode of the second red light emitting element, and which is configured to detect a magnitude of a first current flowing through the first and second red light emitting elements and to adjust the first current based on a duty ratio of a first PWM signal input and the magnitude of the first current detected;
a second control circuit which is connected to an anode of the first green light emitting element and a cathode of the second green light emitting element, and which is configured to detect a magnitude of a second current flowing through the first and second green light emitting elements and to adjust the second current based on a duty ratio of a second PWM signal input and the magnitude of the second current detected; and
a third control circuit which is connected to an anode of the first blue light emitting element and a cathode of the second blue light emitting element, and which is configured to detect a magnitude of a third current flowing through the first and second blue light emitting elements and to adjust the third current based on a duty ratio of a third PWM signal input and the magnitude of the third current detected.

2. The information processing apparatus according to claim 1, further comprises a first generation circuit configured to generate a first luminance control signal, a second generation circuit configured to generate a second luminance control signal, and a third generation circuit configured to generate a third luminance control signal and in which the first control circuit includes a circuit which is supplied with the first luminance control signal generated by the first generation circuit to adjust a magnitude of a current flowing through the first and second red light emitting elements according to a duty ratio of the input first luminance control signal, the second control circuit includes a circuit which is supplied with the second luminance control signal generated by the second generation circuit to adjust a magnitude of a current flowing through the first and second green light emitting elements according to a duty ratio of the input second luminance control signal and the third control circuit includes a circuit which is supplied with the third luminance control signal generated by the third generation circuit to adjust a magnitude of a current flowing through the first and second blue light emitting elements according to a duty ratio of the input third luminance control signal.

3. The information processing apparatus according to claim 1, further comprising:
a fourth control circuit which is connected to an anode of the first white light emitting element and a cathode of the second white light emitting element, and which is configured to detect a magnitude of a fourth current flowing through the first and second white light emitting elements and to adjust the fourth current based on a duty ratio of a fourth PWM signal input and the magnitude of the fourth current detected;
wherein the light source further comprises a first white light emitting element in the first area and a second white light emitting element connected in series to the first white light emitting element in the second area.

4. The information processing apparatus according to claim 1, wherein the arrangements of the light emitting elements in the first and second areas are determined according to the control circuits connected thereto.

5. The information processing apparatus according to claim 1, wherein the light source further comprises a third area and a fourth area, the third area comprising a third red light emitting element, third green light emitting element and third blue light emitting element which are arranged in the one direction, and the fourth area comprising a fourth red light emitting element connected in series to the third red light emitting element, a fourth green light emitting element connected in series to the third green light emitting element and a fourth blue light emitting element connected in series to the third blue light emitting element, the fourth red light emitting element, the fourth green light emitting element, and the fourth blue light emitting element being arranged in the one direction, and which further comprises a first board which is provided on a right portion of the one end portion and on which the first and second areas are provided and a second board which is provided on a left portion of the one end portion and on which the third and fourth areas are provided.

6. The information processing apparatus according to claim 5, further comprising:

a fourth control circuit which is connected to an anode of the third red light emitting element and a cathode of the fourth red light emitting element, and which is configured to adjust a magnitude of a current flowing through the third and fourth red light emitting elements;

a fifth control circuit which is connected to an anode of the third green light emitting element and a cathode of the fourth green light emitting element, and which is configured to adjust a magnitude of a current flowing through the third and fourth green light emitting elements;

a sixth control circuit which is connected to an anode of the third blue light emitting element and a cathode of the fourth blue light emitting element, and which is configured to adjust a magnitude of a current flowing through the third and fourth blue light emitting elements;

first terminals provided on the first board and connected to the first, second and third control circuits; and second terminals provided on the second board and connected to the fourth, fifth and sixth control circuits, wherein the first and second terminals being arranged to sandwich the light guide plate.

7. The information processing apparatus according to claim 1, further comprising:

a graphics controller configured to generate a video signal;

a cable configured to transmit the video signal output from the graphics controller; and an interface which is an interface connected to the cable and having terminals which receive currents supplied from the first, second and third control circuits.

8. An information processing apparatus comprising:

a display panel configured to display an image;

a light source configured to emit light and comprising a first area and a second area which are arranged in a one direction, the first comprising a first red light emitting element, first green light emitting element, and first blue light emitting element which are arranged in the one direction, and the second area comprising a second red light emitting element connected in series to the first red light emitting element, a second green light emitting element connected in series to the first green light emitting element and a second blue light emitting element connected to the first blue light emitting element, the second red light emitting element, the second green light emitting element, and the second blue light emitting element being arranged in the one direction;

a light guide plate provided on the rear surface of the display panel, and including an end portion to which the light source is attached, wherein the light emitted from the light source is guided to illuminate the display panel;

a storage section configured to store first luminance control data used to set luminance levels of the first and second red light emitting elements, second luminance control data used to set luminance levels of the first and second green light emitting elements and third luminance control data used to set luminance levels of the first and second blue light emitting elements, the first, second and third luminance control data items being set according to a turn-on period of the light source;

a first signal generation circuit configured to generate a first luminance control signal according to the turn-on period of the light source and the first luminance control data;

a second signal generation circuit configured to generate a second luminance control signal according to the turn-on period of the light source and the second luminance control data;

a third signal generation circuit configured to generate a third luminance control signal according to the turn-on period of the light source and the third luminance control data;

a first control circuit which is connected to an anode of the first red light emitting element and a cathode of the second red light emitting element, and which is configured to detect a magnitude of a current flowing through the first and second red light emitting elements and adjust the magnitude of the current flowing through the first and second red light emitting elements based on the first luminance control signal generated from the first signal generation circuit and the detected magnitude of the current flowing through the first and second red light emitting elements;

a second control circuit which is connected to an anode of the first green light emitting element and a cathode of the second green light emitting element, and which is configured to detect a magnitude of a current flowing through the first and second green light emitting elements and adjust the magnitude of the current flowing through the first and second green light emitting elements based on the second luminance control signal generated from the second signal generation circuit and the detected magnitude of the current flowing through the first and second green light emitting elements; and a third control circuit which is connected to an anode of the first blue light emitting element and a cathode of the second blue light emitting element, and which is configured to detect a magnitude of a current flowing through the first and second blue light emitting elements and adjust the magnitude of the current flowing through the first and second blue light emitting elements based on the third luminance control signal generated from the third signal generation circuit and the detected magnitude of the current flowing through the first and second blue light emitting elements.

9. The information processing apparatus according to claim 8, wherein the light source further comprises a first white light emitting element in the first area and a second white light emitting element connected in series to the first white light emitting element in the second area and which further comprises a fourth control circuit which is connected to an anode of the first white light emitting element and a cathode of the second white light emitting element to adjust a magnitude of a current flowing through the first and second white light emitting elements.

10. A luminance control method for an information processing apparatus, the apparatus comprising:

a display panel configured to display an image;

a light source configured to emit light and comprising a first area and a second area which are arranged in a one direction, the first area comprising a first red light emitting element, first green light emitting element, and first blue light emitting element which are arranged in the one direction, and the second area comprising a second red light emitting element connected in series to the first red light emitting element, a second green light emitting element connected in series to the first green light emitting element and a second blue light emitting element connected to the first blue light emitting element, the second red light emitting element, the second green light emitting element, and the second blue light emitting element being arranged in the one direction;

a light guide plate provided on the rear surface of the display panel, including an end portion to which the light source is attached, wherein the light emitted from the light source is guided to illuminate the display panel;

a first control circuit which is connected to an anode of the first red light emitting element and a cathode of the second red light emitting element;

a second control circuit which is connected to an anode of the first green light emitting element and a cathode of the second green light emitting element; and a third control circuit which is connected to an anode of the first blue light emitting element and a cathode of the second blue light emitting element;

wherein the method comprises:

detecting a magnitude of a first current flowing through the first and second red light emitting elements by use of the first control circuit and adjusting the first current based on a duty ratio of a PWM signal input and the magnitude of the first current detected;

detecting a magnitude of a current flowing through the first and second green light emitting elements by use of the second control circuit and adjusting the first current based on a duty ratio of a PWM signal input and the magnitude of the first current detected; and detecting a magnitude of a current flowing through the first and second blue light emitting elements by use of the third control circuit and adjusting the first current based on a duty ratio of a PWM signal input and the magnitude of the first current detected.

11. The luminance control method according to claim 10, wherein the information processing apparatus further comprising a first generation circuit configured to generate a first luminance control signal, a second generation circuit configured to generate a second luminance control signal and a third generation circuit configured to generate a third luminance control signal, the first control circuit is supplied with the first luminance control signal generated from the first generation circuit and adjusts a magnitude of a current flowing through the first and second red light emitting elements according to a duty ratio of the input first luminance control signal, the second control circuit is supplied with the second luminance control signal generated from the second generation circuit and adjusts a magnitude of a current flowing through the first and second green light emitting elements according to a duty ratio of the input second luminance control signal, and the third control circuit is supplied with the third luminance control signal generated from the third generation circuit and adjusts a magnitude of a current flowing through the first and second blue light emitting elements according to a duty ratio of the input third luminance control signal.

12. The luminance control method according to claim 10, wherein the information processing apparatus further comprises:

a first generation circuit configured to generate a first luminance control signal;

a second generation circuit configured to generate a second luminance control signal; and a third generation circuit configured to generate a third luminance control signal, the method further comprising:

supplying the first luminance control signal to the first control circuit;

adjusting, by the first control circuit, a magnitude of a current flowing through the first and second red light emitting elements according to a duty ratio of the input first luminance control signal, supplying the second luminance control signal the second control circuit;

adjusting, by the second control circuit, a magnitude of a current flowing through the first and second green light emitting elements according to a duty ratio of the input second luminance control signal;

supplying the third luminance control signal the third control circuit; and adjusting, by the third control circuit, a magnitude of a current flowing through the first and second blue light emitting elements according to a duty ratio of the input third luminance control signal.

* * * * *